May 28, 1957        H. C. RICE        2,793,678

TRACTOR SEAT CONSTRUCTION

Filed Feb. 16, 1953        2 Sheets-Sheet 1

INVENTOR.
HERBERT C. RICE
BY
ATTORNEY.

May 28, 1957 H. C. RICE 2,793,678
TRACTOR SEAT CONSTRUCTION
Filed Feb. 16, 1953 2 Sheets-Sheet 2
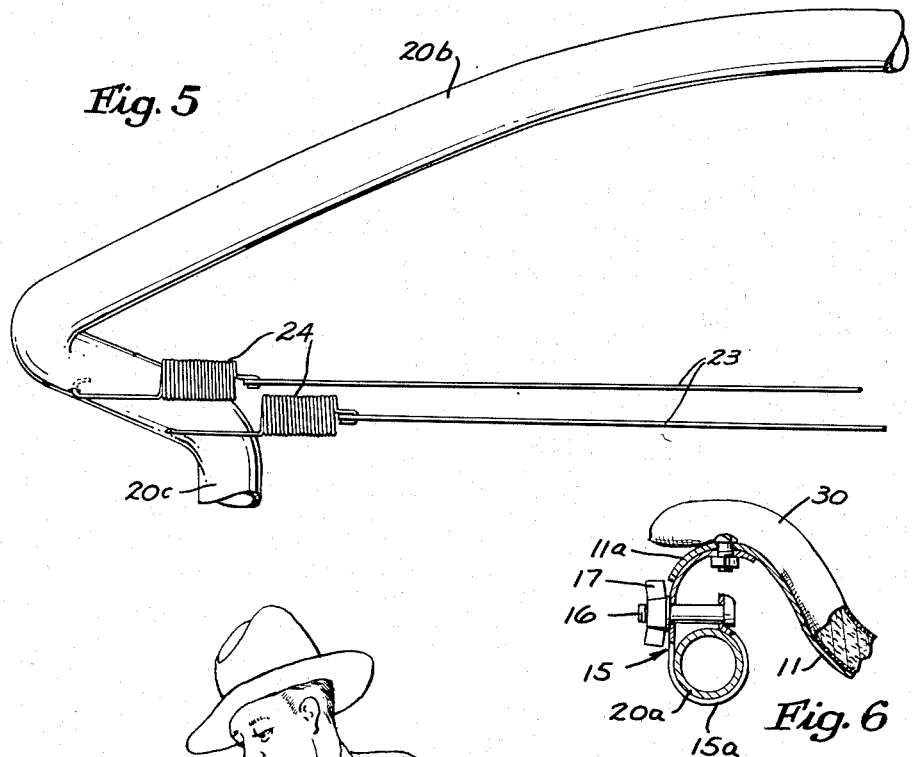
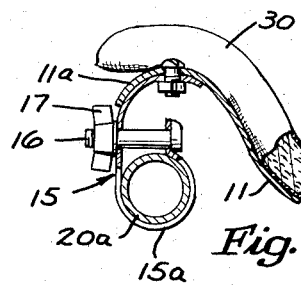
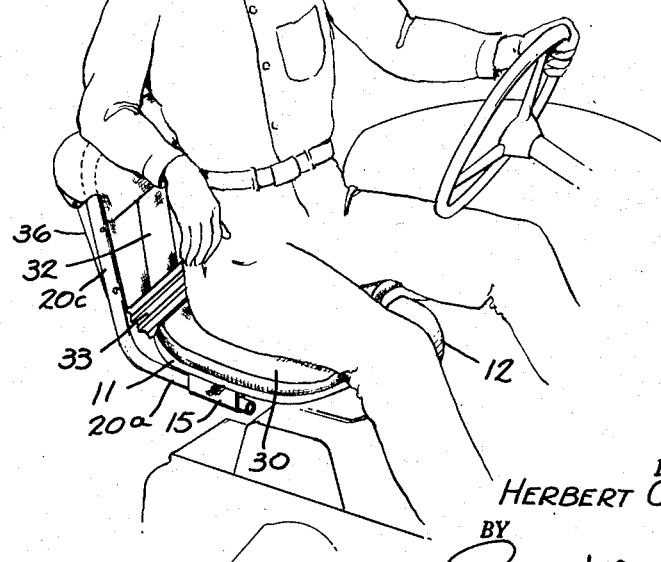
INVENTOR.
HERBERT C. RICE
BY
ATTORNEY.

United States Patent Office 2,793,678
Patented May 28, 1957

2,793,678
TRACTOR SEAT CONSTRUCTION
Herbert C. Rice, Detroit, Mich.

Application February 16, 1953, Serial No. 337,133

2 Claims. (Cl. 155—51)

This invention relates to tractors and more particularly to an improved seat construction therefor.

It is well appreciated in the art that tractors are operated in rough terrain, and their use often requires going over road ditches, ruts, field furrows, and other unevenness in the ground. Therefore, tractors give extremely rough ride to operators, making driving of tractors a rather difficult physical work requiring strain and exertion. It is well known that the exertion in operating a tractor is such that even with a person of a rather rugged physique, the resulting fatigue is very serious and is a real and serious threat to operator's health. It should be appreciated that due to the nature of the tractor construction, operation of a tractor is very tiresome even over relatively smooth roads. Considerable portion of the resulting fatigue is due to the lack of proper support for operator's back.

Tractor operators that have to work with tractors for extended periods of time are often seriously affected in their health, usually because of development of kidney troubles. The above problem has reached such proportions that establishing endowment funds in major universities for research directed toward solving the above difficulties has been seriously considered by the industry.

In spite of generally recognized need for back rests in tractor seats, due to peculiarities of tractor construction, providing in a tractor a seat construction with a back rest that would afford its operator a comfortable ride is very difficult. Most of conventional tractors use seats of the so-called pan-type. A seat of this type is usually in the form of a sheet-metal pan shaped to conform to the outline of operator's body and provided with downwardly extending flanges to increase rigidity of the pan, since the same are usually made of relatively thin sheet metal.

Pan seats are relatively deep, and therefore in addition to the comfort which they afford because of their configuration, such seat also operates to steady the operator and prevent him from sliding on the seat. A tractor driver riding in a pan seat is less likely to be thrown out of the seat when the tractor suddenly tilts sidewise than a driver of a tractor having a flat seat. In general, seats of the pan-type possess a number of important advantages, and therefore discarding them for the sake of introducing upholstered seats having cushions and backrests similarly to old carriage seats, has been done only in a few makes of tractors.

On the other hand, pan-type tractor seats appeared to afford little opportunity for improvement. Conventional seats of the pan type heretofore have been considered by those skilled in the art as constructions that have already reached the logical conclusion of their design, and no appreciable improvements therein for comfort of the operator has been attempted for a number of years. Also, provision of a backrest on the seats of the pan-type has heretofore been considered impractical in view of the fact that a formed seat fixes operator's position therein more definitely than a chair or a flat seat, and therefore a fixed backrest that would be equally comfortable for operators of various weights and heights is virtually impossible to produce. In addition, it has been found that having any metal members at the sides or in the back of the operator is rather dangerous, since such members, even if padded, could cause breakage of ribs or other injury to the operator in cases of violent tilting of the tractor.

Upholstering tractor seats was considered impractical since such seats are usually exposed to rain, dust and snow, and such upholstery and padding would get wet and dirty very quickly, and would soon deteriorate and wear out because of hard wear to which it is subjected, presenting a nuisance rather than an advantage in a tractor. In addition, upholstered seats of the flat type having cushions permitting operators to slide sidewise, unquestionably required provision of the arm rests at the sides of such seats, and inviting dangers explained above.

It is an object of the present invention to provide an improved tractor seat construction of the pan type, whereby the above difficulties and disadvantages are overcome and largely eliminated.

Another object of the present invention is to provide an improved tractor seat construction including a pan-type seat and a backrest adapted to accommodate drivers of various heights and weights.

A further object of the present invention is to provide an improved tractor seat which has the advantages of an upholstered seat and yet does not require provision of the side bars or arm rests extending on sides of the operator and thus presenting a danger for him.

A still further object of the present invention is to provide an improved tractor seat providing additional comfort to the driver when the same is riding the tractor in a half-turned position in order to observe operation of the implement behind the tractor.

A still further object of the present invention is to provide an improved upholstered tractor seat in which the upholstery need not be exposed to rain or snow, or need not be left on the seat when the tractor is not in use.

A still further object of the present invention is to provide a seat construction of the foregoing nature which may be incorporated into tractors already in the field, as well as on original equipment, i. e. on tractors in the process of their manufacture.

Further objects and advantages of this invention will be apparent from the following description and appended claims, reference being had to the accompanying drawings forming a part of this specification, wherein like reference characters designate corresponding parts in the several views.

Fig. 5 is a fragmentary top view showing a connection of the back-supporting metal strips to the frame of the back-rest.

Fig. 6 is a fragmentary sectional view taken in the direction of the arrows on the section plane passing through the line 6—6 of Fig. 3.

Fig. 7 is a perspective view showing the operator in the seat of my improved construction and driving the tractor in a half-turned position for observing operation of the implement behind the tractor, the observer being shown leaning on the backrest for comfort and support.

Figure 1:
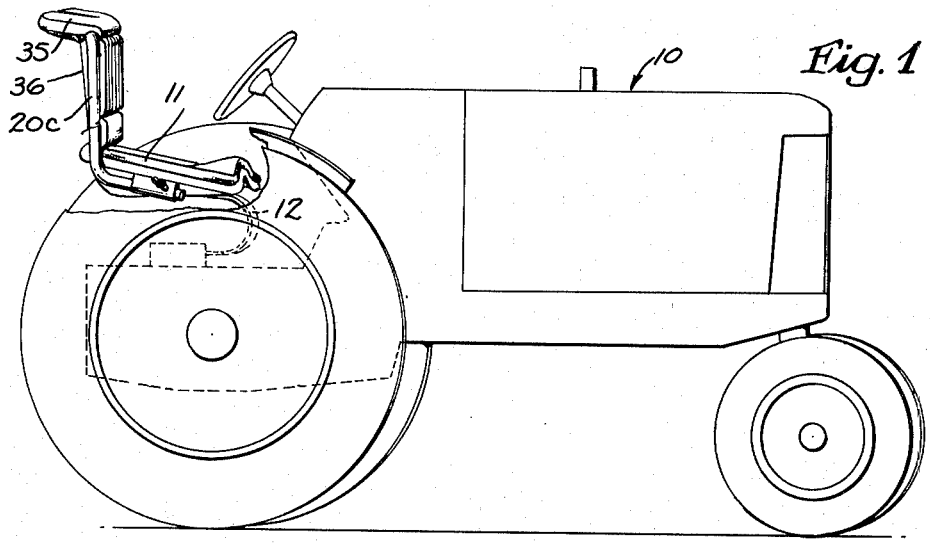
Fig. 1 is an elevational view illustrating a tractor provided with a seat embodying the present invention.
Figures 2, 3:
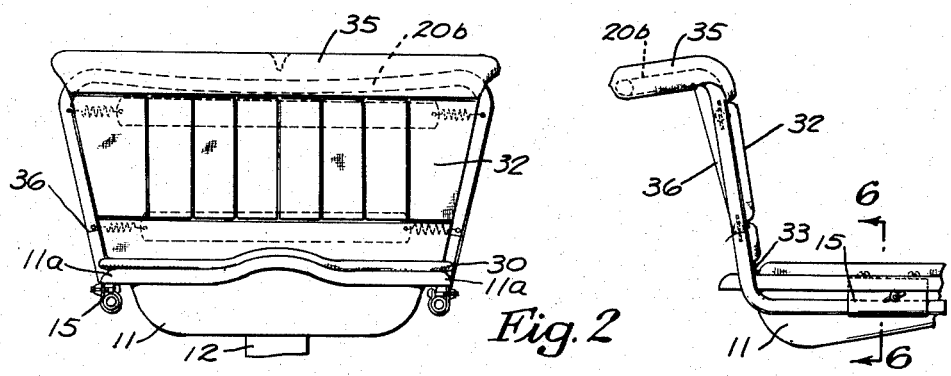
Fig. 2 is a front view of the seat of Fig. 1 shown in an angular position corresponding to that assumed by a seat on the tractor when the operator is in the seat.
Fig. 3 is a side view of the seat of Fig. 2.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology and terminology employed herein is for the purpose of description and not of limitation.

In accordance with the invention I preferably retain in my improved seat construction the formed seat pan such as is now used in conventional tractor seats. I provide a backrest including a metal frame preferably of a tubular cross-section, and connect the frame to the seat in such a manner that the metal frame clears completely the sides of the seat as well as the back thereof and is not likely to be contacted by the driver of the tractor when the tractor is in operation. I also provide a one-piece articulated pad adapted to cover the seat and the backrest. The articulated upholstered pad is backed up by spring mounted steel strips extending between the metal members of the backrest frame, whereby the impact of the operator's body is received by the padded resilient means and is thus absorbed instead of causing injury to the operator. The articulated pad is so constructed that it can be easily slipped on the backrest and arranged on the seat and retained in place by tie cords or web strips. It can be easily taken off, rolled or folded, and taken in by the operator to prevent its getting dusty or wet when the tractor is left in the open. The means connecting the backrest to the seat pan provide for adjustment of the backrest longitudinally of the tractor. The entire backrest may be easily removed from the tractor seat, thus converting said seat into a conventional seat. By virtue of such a construction, conventional tractor seats may be easily converted to receive my improved backrest and thus gain the advantages thereof.

In the drawings there is shown, by way of example, a tractor provided with a seat embodying the present invention. The tractor, which may be of any suitable type, is generally designated by the numeral 10 and is provided with a seat including a formed pan 11 supported or suspended on the tractor structure in any suitable manner such as with the aid of a C-type spring 12. The pan 11 is suitably shaped by relatively deep forming operation to provide a comfortable seat for the operator and to steady him in the seat, preventing him from sliding in the seat as is the case with flat upholstered seats.

At both sides of the pan 11 there are secured to the rolled flange 11a thereof a bracket 15 formed to provide an open tubular portion 15a which can be drawn together with the aid of bolts 16 having wing nuts 17. The tubular portions 15a are adapted to receive the forwardly extending portions 20a of a backrest frame 20 of an inverted U-shape. The upper or leg-connecting portion 20b of the frame 20 is bent rearwardly to extend in a substantially horizontal plane, while the intermediate portions 20c of the brackrest frame form side vertically extending members.

Figure 4:
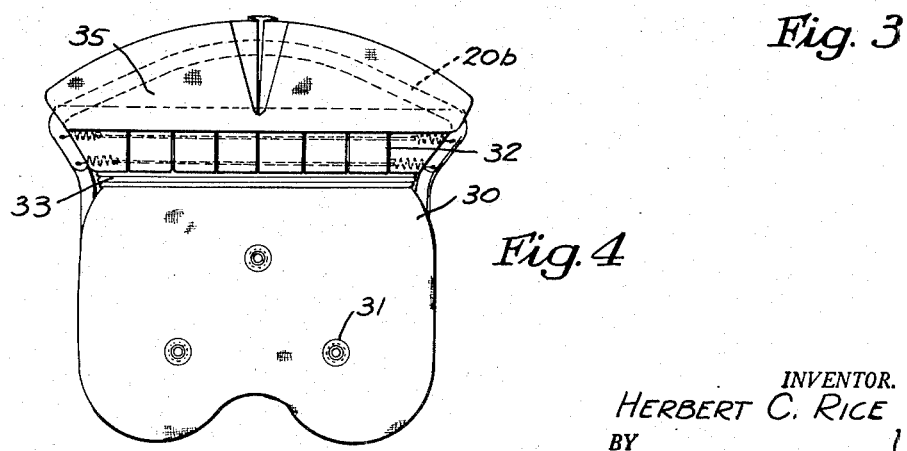
Fig. 4 is a top view of the seat of Figs. 2 and 3.

Two steel strips 23 are connected to the side portions 20c of the backrest frame with the aid of coil springs 24 provided at the ends of said strips. The strips 23 thus provide resilient supporting member for the operator's back. When viewed in the top view (see Fig. 4), said strips 23 extend in a cord-like manner between the ends of the arcuate portion 20b. The springs 24 are so selected that should the operator be thrown violently in the rearward direction, they will absorb a considerable portion of such an impact without failure or permitting the operator's body to be pushed against the portion 20b. I prefer to provide two of such members, however only one member or more than two may also be used under certain conditions.

By virtue of such a construction the backrest may be adjusted by the operator to suit his size and type of body, without the use of any tools and merely by loosening the wing nuts 17, moving the backrest to a desired position and tightening them again. Such adjustment may be made by the operator while remaining in his seat and selecting the position of the backrest by actually trying and feeling its supporting comfort. It will also be noted that the wing nuts 17 are out of the operator's way and do not interfere with his movements and do not protrude outwardly for any appreciable distance.

In accordance with the invention, I also provide an articulated upholstered pad that can be easily connected to the backrest and cover the same as well as the seat pan. In accordance with the invention, said pad comprises a padded seat portion 30 provided with ventilating openings 31, a padded vertical section 32 connected to the seat portion 30 with the aid of an accordion or pleated portion 33 to provide for extension or folding of said accordion portion in adjusting the backrest frame 20. The backrest portion 32 rests against the steel strips 23 and is thus supported thereby. A pocket portion 35 connected to the top of the backrest portion 32 is adapted to be slipped on the rearwardly bent portion 20b of the backrest frame thus to retain the entire pad in place. Ties 36 secured to the sides of the pocket portion 35 and adapted to be tied around the vertically extending side members 20c of the brackrest frame may be provided for further security. These ties may be in the form of cords, or pieces of webbing each with a snap fastener at ends. Such ties are wrapped around and tied on the members 20c, or are snapped closed thereon.

The upper part of the pocket portion 35 is padded preferably with rubberized hair or similar material to provide a softened rest for the operator's elbow, when the operator leans on the back shelf thus formed by the pocket portion and supported by the rearwardly bent top 20b of the frame. The possibility of leaning against such a support is an important advantage of my improved seat since in operation of tractors the driver has to ride considerable time in half-turned position in order to observe the implement drawn by the tractor and operating rearwardly thereof. Riding in such an uncomfortable position without any support is one of the features contributing greatly to the general fatigue caused by operating the tractors having conventional seats.

The entire articulated pad is a one-piece construction, and therefore it can be easily taken off from the seat by untying the ties 36 and slipping off the pocket 35 from the rearwardly extending portion 20b. Thereupon, the pad may be taken in by the operator to prevent it from getting dusty or wet.

By virtue of the above described construction the objects of the present invention listed above, and numerous additional advantages are attained.

I claim:

1. In a tractor, a dish shaped sheet metal seat pan operatively supported on the tractor structure, a vertically extending back rest frame of inverted U shape having the ends of its legs bent straight forwardly and its leg-connecting portion bent rearwardly, said back rest being adjustably connected to said seat pan at both sides thereof, with the vertically extending portions of the back rest frame being disposed at the rear of the seat pan and clearing the rear corners thereof and an articulated upholstered pad detachably mounted on said seat and back rest structure and including a padded seat portion received by the seat, a padded back rest portion connected to said padded seat portion and extending vertically therefrom and a pocket portion connected to said padded back rest and slipped over the rearwardly bent part of the back rest frame for retaining the pad in place, the connecting portion between the seat portion and the back rest portion of said pad being of an accordion construction to provide for extending and folding.

2. In a tractor, a dish shaped sheet metal seat pan operatively supported on the tractor structure, a vertically extending back rest frame of inverted U shape having the ends of its legs bent straight forwardly and its leg-connecting portion bent rearwardly, said back rest being connected to said seat pan at both sides thereof, with the vertically extending portions of the back rest frame being disposed at the rear of the seat pan and clearing the rear corners thereof, and an articulated upholstered pad detachably mounted on the seat and the back rest structure and including a padded seat portion received by the seat, a padded back rest portion connected to said padded seat portion and extending vertically therefrom, and a pocket portion connected to said padded back rest portion and slipped over the rearwardly bent part of the back rest frame for retaining the pad in place, said pocket portion being padded in its upper part with rubberized hair adapted to act as a cushion for the operator's elbow, the connecting portion between the seat portion and the back rest portion of said pad being of an accordion construction to provide for extending and folding.

References Cited in the file of this patent

UNITED STATES PATENTS

| | | |
|---|---|---|
| 1,759,978 | Donaldson | May 27, 1930 |
| 1,973,627 | Harter | Sept. 11, 1934 |
| 2,150,429 | De Sanno | Mar. 14, 1939 |
| 2,365,026 | Tyler | Dec. 12, 1944 |
| 2,578,879 | De Young | Dec. 18, 1951 |

FOREIGN PATENTS

| | | |
|---|---|---|
| 91,220 | Sweden | Jan. 12, 1938 |
| 776,948 | France | Nov. 17, 1934 |